Dec. 18, 1962  F. DANIELS  3,069,341
NEUTRONIC REACTOR
Filed Dec. 3, 1946  3 Sheets-Sheet 2
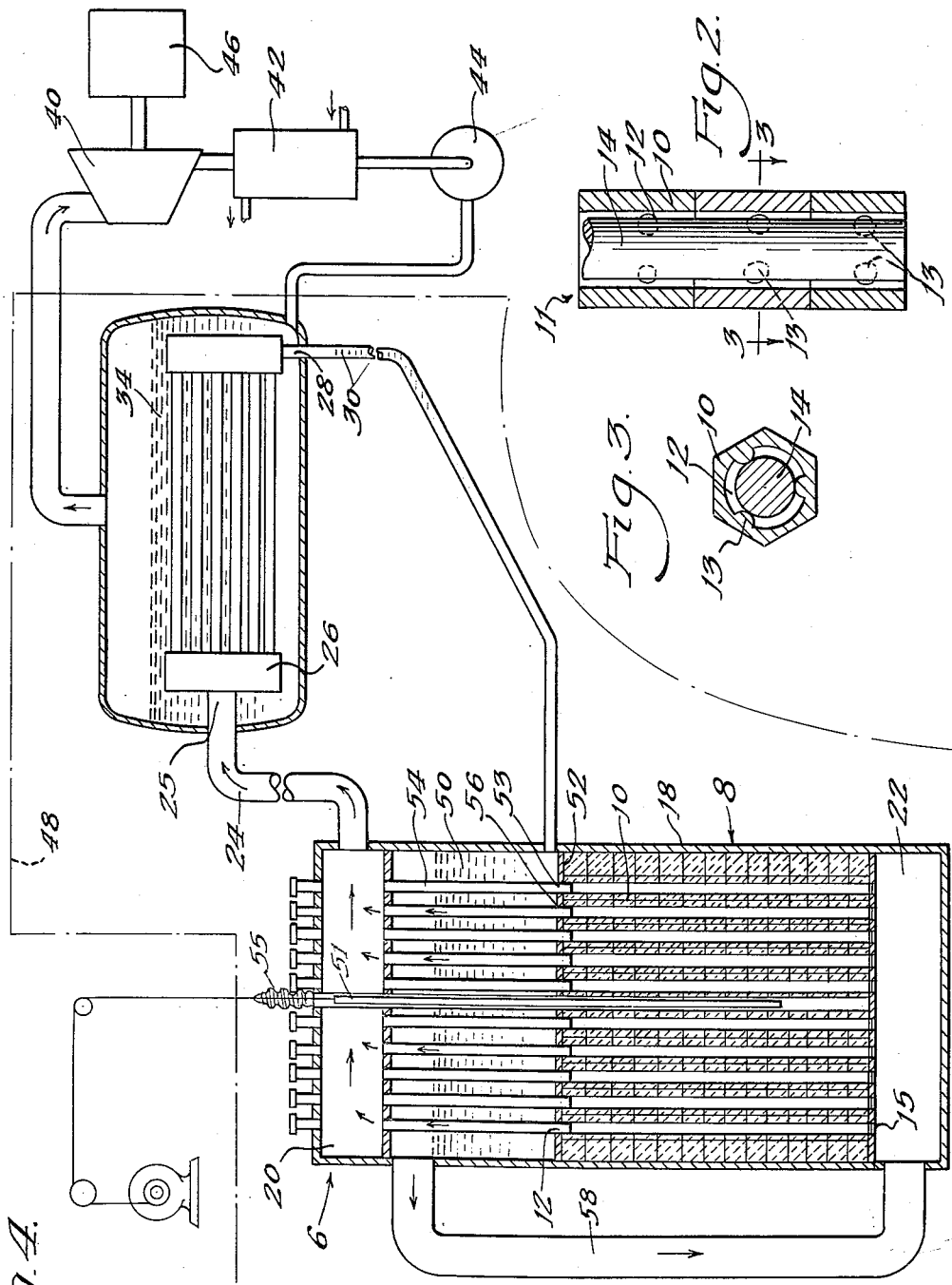
Inventor:
Farrington Daniels
By Robert A. Lavender
Attorney Dec. 18, 1962   F. DANIELS   3,069,341
NEUTRONIC REACTOR
Filed Dec. 3, 1946   3 Sheets-Sheet 3

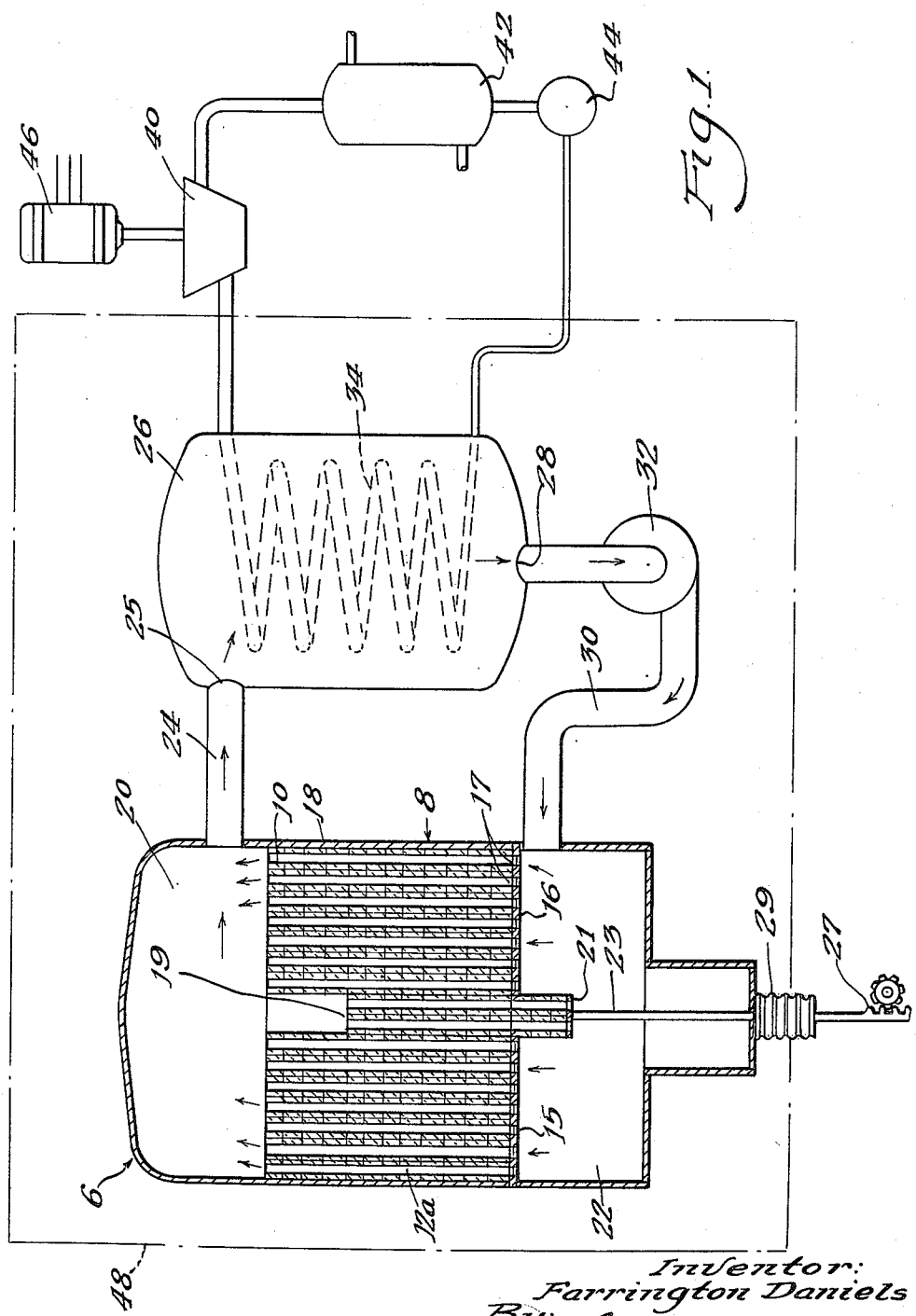

Inventor:
Farrington Daniels
By: Robert H. [signature]
Attorney

United States Patent Office 3,069,341
Patented Dec. 18, 1962

3,069,341
NEUTRONIC REACTOR
Farrington Daniels, Madison, Wis., assignor to the United States of America as represented by the United States Atomic Energy Commission
Filed Dec. 3, 1946, Ser. No. 713,660
3 Claims. (Cl. 204—193.2)

This invention relates to an atomic power plant for converting the binding energy of atomic nuclei into electrical energy adapted to be transmitted and utilized for useful purposes.

As has been disclosed by others, for example, in the Fermi et al. Patent 2,708,656, dated May 17, 1955, the active portion of a neutronic chain reactor utilizing slow neutrons comprises a fissionable material disposed in a neutron moderator. As is now well known, certain fissionable materials such as the isotope of uranium of atomic weight 235 and the isotope of plutonium of atomic weight 239, commonly designated as $U^{235}$ and $Pu^{239}$ respectively, upon neutron bombardment, undergo fission into two or more nuclei which appear lower in the periodic table of the elements. Fast neutrons are in turn emitted. The neutron moderator is introduced into the active portion of a chain reactor to reduce the velocities of the newly emitted neutrons to a level where they are most effective to induce new fissions, the cycle thus created constituting the neutronic chain reaction.

There is released in each such fission a large quantity of energy in the form of heat. It is well known that prime movers such as steam turbines, adapted to convert heat energy into mechanical energy which may be utilized to produce electrical energy, are much more efficient in utilization of heat energy at high temperatures than at low temperatures.

It is an object of the present invention to provide an atomic power plant maximizing the efficient utilization of the energy released in the chain reaction.

It is a further object of this invention to provide an atomic power plant in which the prime mover, together with all other machinery, is completely shielded from the particles and radiations emanating from the active portion of the reactor.

Other aims and objects of this invention will appear from the description below and from the drawing in which:

FIGURE 1 is a schematic diagram of an atomic power plant;

FIGURE 2 is a fragmentary vertical cross-sectional view, partly in elevation, of one of the elements of which a high-temperature neutronic reactor comprising one portion of the power plant of FIGURE 1 is constructed;

FIGURE 3 is a horizontal cross-sectional view taken on the line 3—3 of FIGURE 2; and FIGURES 4 and 5 are schematic diagrams of atomic power plants having radiation shields containing no machinery.

Figure 5:
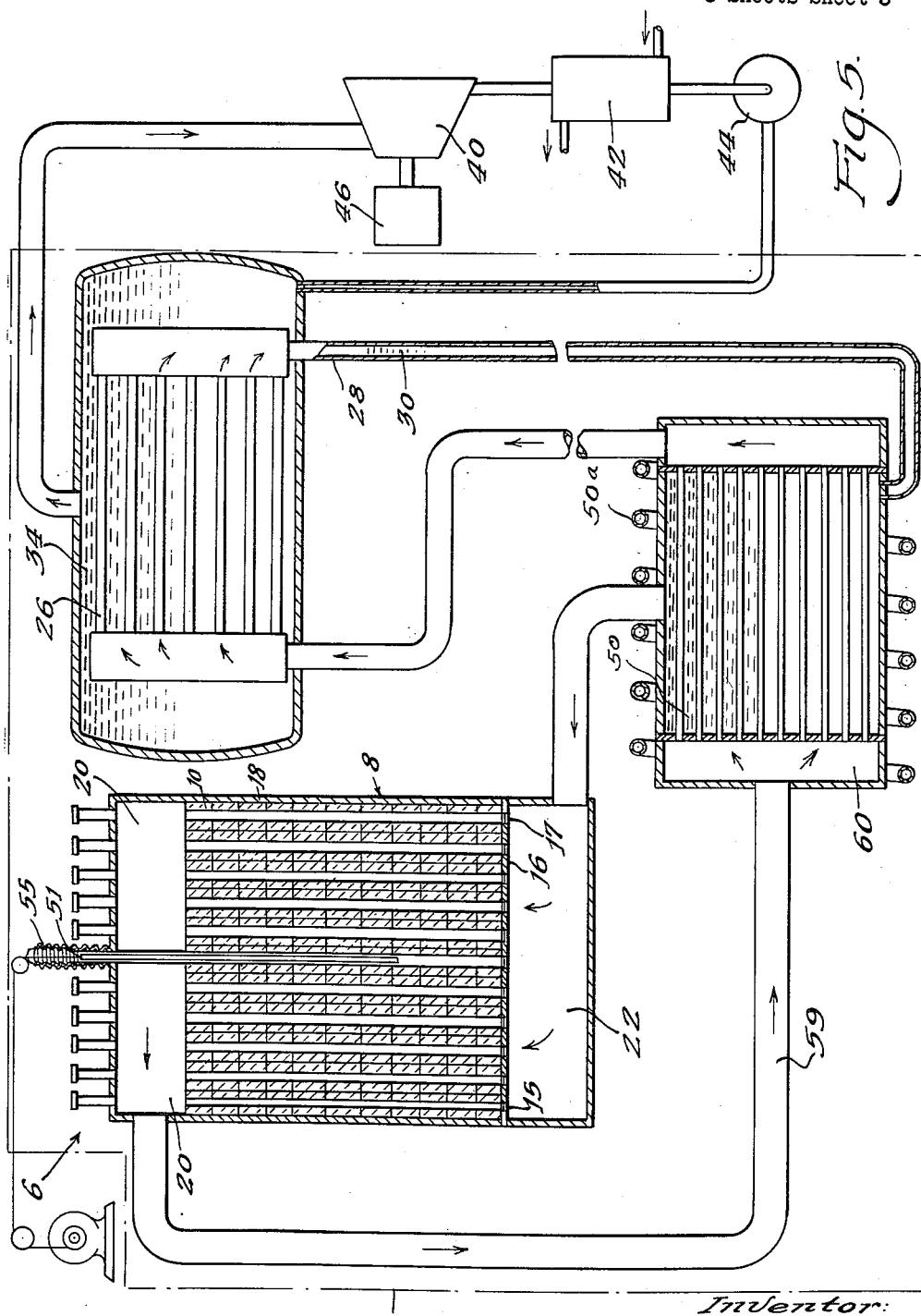

As stated above, in the construction of a neutronic reactor utilizing slow neutrons two types of material are necessary. One is the "fuel," a material which undergoes fission upon exposure to slow neutrons with concurrent liberation of thermal energy and additional neutrons. The other material is the moderator which slows the high energy neutrons from fission down to the thermal energies at which they are captured by the "fuel" to produce further fissions. The moderator preferably consists of light atoms which readily remove kinetic energy from the neutrons but do not absorb the neutrons to a significant extent. In a reactor for operation at high temperatures the additional physical requirements for the two types of material are: both must have a high melting point, high heat conductivity, a low coefficient of thermal expansion and a low vapor pressure at elevated temperatures.

The materials which best fit the above requirements are beryllium oxide, BeO, as the moderator, and uranium dioxide, $UO_2$, as the "fuel." Beryllium oxide has a melting point of 2400° C. and a vapor pressure of $10^{-5}$ mm. at 1800° C. Uranium dioxide has a melting point of greater than 2200° C. and a vapor pressure of $7 \times 10^{-5}$ mm. at 1870° C. The heat conductivity of beryllium oxide is about the same as metallic iron. Beryllium, together with deuterium and carbon, has long been recognized as a valuable moderator for neutrons. Beryllium oxide, then, is an excellent moderator in addition to being a refractory material.

Referring now to FIGURE 1, a neutronic chain reactor is generally designated by the numeral 6. The active portion thereof is generally designated by the numeral 8. The active portion is formed in the following manner:

Hexagonal blocks 10 of beryllium oxide, as illustrated in FIGURES 2 and 3, are piled on top of each other to form a plurality of rectilinear hexagonal stacks 11, one of which is shown in FIGURES 2 and 3. Through each block 10 is an axial cylindrical aperture 12 (FIG. 4), the apertures 12 thus constituting a continuous cylindrical aperture through the stack 11. Through this aperture 12 extends a series of cylindrical rods 14 in end-to-end relationship. The rods 14 are composed of sintered beryllium oxide and uranium dioxide, the latter being uniformly distributed throughout the former. The active portion 8 is built of a large number of these hexagonal stacks 11 placed contiguous to each other so as to form a vertical cylinder of beryllium oxide, the vertical apertures 12 being equally spaced therein and the rods 14 partially filling said apertures. The diameter of the rods 14 is less than the diameter of the apertures 12 so that there exists through each of said apertures 12 an annulus surrounding the rods 14, the annulus being adapted to permit the flow of a coolant through the apertures 12 and past the rods 14. The rods 14 are maintained centrally of the apertures 12 by lugs 13 projecting from the walls of the apertures 12.

Referring again to FIGURE 1, the active portion 8 rests on a thick metal plate 16 preferably of steel having a high melting point. The metal plate 16 has apertures 17 therethrough corresponding in position to the apertures 12 in the individual stacks 11. Across each of the apertures 17 in the steel plate 16 is a horizontal rod 15 suitable to support the weight of the rods 14 but to allow the flow of gas into the apertures 12. The active portion 8 is surrounded at its periphery by a pressure tight shell 18, also preferably of steel. The central portion 19, of the active portion 8, is supported on a platform 21, which platform 21 constitutes the central portion of plate 16, but is separate therefrom and adapted to be moved vertically by means of support rod 23, which is driven by a rack-and-pinion 27, through a gas-tight bellows 29, thus effectively changing the size of the active portion 8 to control the chain reaction.

Above the active portion 8 within the shell 18 is an outlet header 20. Below the active portion 8 and the plate 16 within the shell 18 is an inlet header 22. Extending from the outlet header 20 through the shell 18 is a conduit 24, preferably of a refractory material. The conduit 24 leads to the inlet 25 of an evaporator or heat exchanger 26. The heat exchanger 26 likewise has an outlet 28 which is in turn attached to one end of the conduit system 30, the other end of which terminates in inlet header 22. In the conduit system 30 is a blower 32 adapted to circulate a gas.

The system as described above, comprising inlet header 22, apertures 12, outlet header 20, conduit 24, heat exchanger 26, and conduit system 30, is filled with a gas such as helium. The gas is circulated through the system by the blower 32. The gas in the inlet header 22 at a temperature of, for example, 500° F. and a pressure of for example, one to three atmospheres is forced upward through the apertures 17 in the plate 16 and through the apertures 12 in the stacks 11 into the outlet header 20. During its transit through the apertures 12 the gas is heated by the heat energy released in the active portion 8 by the chain reaction to a temperature of, for example 1400° F. to 1800° F. with a pressure drop through the apertures 12 of, for example, 0.15 atmosphere. The gas then flows through the conduit 24 and the heat exchanger 26. The heat energy imparted to the gas by the active portion 8 is transmitted to the secondary system of the heat exchanger 26 to be described below. The gas, after thus being cooled, is then returned to the inlet header 22 by the conduit system 30 and blower 32.

In the heat exchanger 26 is a secondary portion 34. This secondary portion 34 is connected in series with a turbine 40, a condenser 42 and a pump 44. The secondary system thus described contains water in the manner usual to such systems, the water being boiled in the secondary portion 34 of the heat exchanger 26, the resultant steam driving the turbine 40 and then being condensed in the condenser 42. The turbine 40 is mechanically coupled to a generator 46.

The neutronic reactor 6 liberates, for example, 228,000 B.t.u. per minute of heat energy, which is equivalent to 4,000 kw. of heat energy, and the generator produces, for example, 1,000 kw. of electrical energy, the system thus having an efficiency of 25 percent. If desired, up to 40,000 kw. of heat energy may be liberated. The chain reacting system is shielded from the exterior in the usual manner by a shield 48 comprising, for example, a thick wall of concrete. In the system illustrated in FIGURE 1 the turbine 40 and the generator 46 are completely shielded from the effects of particles and radiations emanating from the chain reaction. Since the gas coolant circulating system is completely enclosed within the shield 48 and since the heat exchanger 26 does not permit the escape of radioactive particles that might be contained in the gas into the secondary portion 34, no radioactive materials may escape beyond the shield 48.

In FIGURE 4 is illustrated a system in which no machinery is contained within the shield 48, thus minimizing the necessity of making repairs in a region subjected to the residual radioactivity which, as is well known, is present even after cessation of the chain reaction.

The active portion 8 is of the same construction as the active portion 8 in the embodiment of FIGURE 1, except that control of the chain reaction is accomplished by adjusting the position of control rod 51 by means of the pressure-tight bellows 55. The control rod 51 is composed of a suitable neutron absorber such as an alloy containing boron.

Above the active portion 8 is a reservoir of water 50 or other substance which has a boiling point above room temperature separated from the active portion 8 by a pressure-tight steel plate 52. The steel plate 52 has apertures 53 therein adapted to receive pipes 54 which serve to conduct the coolant emanating from the apertures 12 through the reservoir 50 and into the outlet header 20. The joints 56 between the pipes 54 and the steel plate 52 must be pressure-tight in order to prevent the seepage of water from the reservoir 50 into the active portion 8. Above the level of the water a conduit 58 leads from the reservoir 50 down to the inlet header 22. The apertures 12 lead from the inlet header 22 into the pipes 54, the outlet header 20, the conduit 25 and the heat exchanger 26. The heat exchanger 26 is elevated in space with respect to the reservoir 50 by a distance of, for example, 35 feet. The conduit 30 leads down from the outlet 28 of the heat exchanger 26 to the bottom of the reservoir 50. The water in the reservoir 50 is heated by heat from the active portion 8 and from the tubes 54 and evaporates into the conduit 58, saturated steam thus being formed at a pressure of, for example, 6 atmospheres and a temperature of 160° C. The steam flows through the apertures 12 and the pipes 54 and emerges into the outlet header 20 at a temperature of, for example, 500° C. and a pressure of, for example, 5.5 atmospheres. From the outlet header, the superheated steam flows through the conduit 24 into the elevated heat exchanger 26 where it is condensed and flows downward into conduit 30. When the system is in equilibrium, as will occur shortly after operation commences, the upper surface of the condensed water in the conduit 30 is elevated a distance of, for example, 32 feet above the surface of the water in the reservoir 50. The water in the conduit 30 thus constitutes a pressure head upon the water in the reservoir 50 and the steam in the conduit 58. The steam, therefore, circulates continuously through the active portion 8 into the heat exchanger 26, where it is condensed, and back into the reservoir 50 as water, where it is again evaporated at a rate of, for example, 190 pounds per minute.

The heat exchanger 26 has a secondary portion 34 and associated turbine 40, condenser 42, and pump 44. The active portion 8 of the reactor 6 liberates, for example, 4,000 kw. of heat energy and the generator 46 produces, for example, 500 kw. of electricity, the system thus having an efficiency of approximately 12½ percent. The system, as illustrated in FIGURE 4, has the advantage that there is no machinery within the shield 48.

It is necessary that the plate 52 be absolutely protected against leakage of water from the reservoir 50 into the active portion 8. If any leak between these portions should develop, the reproduction factor of the neutrons in the active portion 8, i.e., the number of neutrons produced by fission and available for capture to produce further fission, would rise so rapidly as to render control of the reaction difficult, if not impossible.

The difficulties of sealing the reservoir 50 from the active portion 8 in the system of FIGURE 4 are avoided in the system of FIGURE 5. In FIGURE 5 the outlet header 20 is directly above the active portion 8. The steam flows out of the header 20 through the conduit 59, through an auxiliary heat exchanger 60, through the elevated heat exchanger 26 and thence, as water, through the conduit 30. The conduit 30 terminates in a portion of the heat exchanger 60 in heat exchange relationship with the steam flowing in through conduit 59, the water reservoir 50 being within said portion of heat exchanger 60.

It will be readily seen that the systems of FIGURE 4 and FIGURE 5 are similar in principles and operation, the important difference being that in FIGURE 4 the heat exchanger device for evaporating the water in the reservoir 50 is integral with the reactor 6 and above the active portion 8 thereof. In the system of FIGURE 5, the reservoir 50 in which the water is boiled is external to the reactor 6, and thus presents no problem of leakage of the water in the reservoir 50 into the active portion 8 of the reactor 6. In FIGURE 5, a heater diagrammatically illustrated in the form of a heating coil 50a is provided to convert the water in reservoir 50 to steam when starting the system.

The active portion 8 of the reactor 6, as illustrated in FIGURES 1, 4 and 5 may be, for example, 6 to 8 feet in diameter and 6 to 8 feet high. The blocks 10 of which the stacks 11 are constructed may be, for example, three inches outer diameter and two inches inner diameter and three inches in height. The diameter of the rods 14 may be, for example, one and one-half inches, thus leaving a one-fourth inch annulus around the rods 14 for the flow of the gaseous or vapor coolant. In one preferred embodiment of the invention the vertical apertures 12a which are around the outer perimeter of the active portion 8 as indicated in FIGURE 1 are at least partially filled with rods 14a of a material adapted to be converted to a fissionable material upon exposure to neutron flux; for example, the rods 14a may consist of sintered beryllium oxide and thorium dioxide. Thus, neutrons which would in any event escape from the active portion 8 may be utilized to breed new fissionable material.

It is desirable that the beryllium oxide moderator material both in the blocks 10 and the rods 14 be of the highest possible density, since both the weight of the fissionable isotope required to sustain the chain reaction and the weight of the beryllium oxide required, and thus the overall size of the structure necessary to maintain the chain reaction, vary as the inverse square of the ratio of the weight of beryllium oxide in the active portion 8 to the volume of the active portion 8. The theoretical density of beryllium oxide is 3.025, but this bulk density is not attained in practical fabrication of beryllium oxide shapes from powder. The approximate dimensions of the active portion 8 as given above assume a density of the beryllium oxide of approximately 2.7. The embodiments described above have approximately 20 percent voids in the active portion 8 of the reactor 6.

The effect of varying the density of the beryllium oxide may be seen in the following table of critical dimension for a cylindrical active portion 8 having 20 percent voids and containing uranium dioxide in which the uranium has been "enriched" in the isotope of mass 235 so that the $U^{235}$ constitutes 20 percent instead of the 0.71 percent found in natural uranium:

| Density of BeO (gm./cc.) | Ht. of cylinder (ft.) | Diam. of cylinder (ft.) | BeO (kg.) | Be in BeO (kg.) | $U^{235}O_2$ (kg.) | $U^{235}$ in $U^{235}O_2$ (kg.) |
|---|---|---|---|---|---|---|
| 2.7 | 5.2 | 5.6 | 7,160 | 2,580 | 13.8 | 12.2 |
| 2.2 | 6.3 | 6.8 | 11,500 | 4,150 | 20.8 | 18.4 |

It is important further that the beryllium oxide be of what is known as the refractory grade rather than the "low fired" grade. Uranium dioxide is a far more satisfactory form for the fissionable material than the oxide $U_3O_8$. Uranium dioxide has a sufficiently low vapor pressure to avoid substantial volatilization at temperatures up to 1500° C.

The exact design of the active portion 8 of the beryllium oxide moderated chain reactor 6 is not a part of the present invention, although the design incorporating the hexagonal stacks 11 and rods 14 as illustrated in the drawing is well adapted for the type of power plant system herein described. A "pebble" construction as disclosed in the copending application of Farrington Daniels, filed October 11, 1945, Serial No. 621,845, now Patent 2,809,931, dated October 15, 1957, is likewise suitable. The construction illustrated is selected as a preferable embodiment of the invention because in practice an active portion 8 of equalized pebbles has 40 percent to 50 percent voids, and a reactor with 40 percent voids requires nearly twice the weight of beryllium oxide moderator and fissionable material as one with 20 percent voids, assuming a beryllium oxide density of 2.7. The construction has the further advantages of low pressure drop in flowing the gas-like fluid through the active portion 8, and ease of removing the "fuel" rods 14 from the moderator; further, by the use of "fuel" rods 14 of varying diameter in the various parts of the reactive portion 8, or by varying the size of orifices 17, the rate of flow of the gas or vapor coolant may be made proportional to the rate of power generation at the particular part of the active portion 8, so that the coolant entering the outlet header 20 from the apertures 12 at various distances from the axis of the active portion 8 will be uniform in temperature. A structure built of small bricks 10 with single apertures 12 rather than large blocks with many apertures is preferred because of size limitations in the manufacture of refractory pieces of beryllium oxide of the proper density. The hexagonal horizontal cross section of the blocks 12 is preferable in order to facilitate equidistant spacing of the apertures 12 with the use of a single standard shape of brick 10.

The considerations involved in deciding upon the temperature at which the gaseous or vapor coolant enters and leaves the reactive portion 8 include the following:

The design of heat exchanger 26 or 60, or both, together with the headers and conduits, are rendered more complicated at high temperatures. Also, since, as has been disclosed elsewhere, the reactor has a temperature coefficient of reactivity, a wide latitude of the controlling equipment must be provided for high temperature operation to accommodate the difference in reactivity between the room temperature conditions which prevail at the instant of commencement of operation and conditions under the high steady state temperatures.

However, as is well known, the maximum possible temperature of the coolant leaving the active portion is desirable from the point of view of producing in the secondary portion 34 of the heat exchanger 26 steam under conditions favoring high efficiency conversion of heat to power. Consideration of the factors outlined above leads to the setting of an optimum operation at a coolant exit temperature of approximately 1400° to 1800° F.

It should be noted that the highest temperatures attained in the reactor will be at the centers of the "fuel" rods in the portion of the reactor where the specific rate of power production is greatest i.e., near the axis of the cylindrical reactor. This temperature is approximately equal to the effluent temperature of the coolant gas or vapor plus a temperature drop from the center to the outside of the rods. The coolant gas or vapor must be chemically inert with respect to the materials of construction at the temperature of operation of the reactor. It is desirable that it should have a high heat capacity, a low viscosity and a high heat transfer coefficient in order to minimize the pressure drop required for cooling the unit, and in order to minimize the temperature drop across the film of slow moving gas which appears between the bounding surface and main body of a gas of high viscosity. Since, in the embodiment illustrated in the drawing, the "fuel" rods are exposed to the coolant gas and since, as above, the vapor pressure of $U_3O_8$ is excessive at high temperatures, it is desirable to choose a gas or vapor coolant which will not oxidize $UO_2$ into $U_3O_8$. The gas may either be inert with regard to oxidation and reduction or may be reducing in nature. From this point of view nitrogen, carbon monoxide, hydrogen and helium are among the gases that are satisfactory. In using a condensing gas such as steam, the advantage of shielding all moving parts from radioactivity may be attained as illustrated in FIGURES 4 and 5 of the drawing and described above. Such a system, however, is relatively inefficient because of the loss of thermodynamic efficiency which results from the necessity of using a portion of the superheat from the vapor to evaporate the condensate water for restoration to the active portion. Furthermore, it has been found that steam flowing over beryllium oxide at a temperature of greater than 1500° C. produces a reaction which increases the volatility of the beryllium oxide to such an extent that losses of the moderator into the coolant in the steam cooled embodiment are undesirably high when operation at temperatures greater than 1500° C. is undertaken.

In the embodiment of FIGURE 1 helium is a satisfactory coolant gas. It is chemically inert, requires a lower pressure drop for circulation than other inert gases and has a higher heat transfer coefficient than nitrogen. In a reactor of this type, the gas may be at a pressure of, for example, from 1 to 10 atmospheres. In order to reduce the size of the active portion 8 necessary to sustain the chain reaction, it is desirable that the uranium used in the "fuel" rods 14 be enriched in the fissionable isotope $U^{235}$. For example, as stated above, the uranium used may consist of from 20 to 60 percent $U^{235}$ instead of the one part in 140 found in natural uranium.

The shield 48 is preferably a wall of six to eight feet of concrete. Because the coolant is in direct contact with the active portion 8 of the reactor 6 it is necessary that all portions of the system in which the coolant circulates be included within the shield 48 in order to prevent the exterior from being exposed to particles and radiations emanating from materials carried by the coolant from the active portion 8. In this regard the system of FIGURES 4 and 5 offers great advantage since it is not there required that any moving part be contained within the shield 48.

The particular embodiments described above and illustrated in the drawing should not, of course, be considered to limit the present invention. The invention is applicable to atomic power plants other than those specifically described herein. Persons skilled in the art will readily find equivalent embodiments of the teachings of the present invention.

What is claimed is:

1. In an atomic power plant, a neutronic reactor active portion comprising hexagonal BeO blocks having apertures and cylindrical rods of sintered BeO and $UO_2$ positioned in said apertures, the spaces between the apertures and the rods constituting fluid passages through said active portion, a coolant reservoir, fluid conduit means connecting the upper portion of said reservoir to one end of said passages through the active portion, a heat-exchanger elevated with respect to the reservoir, fluid conduit means connecting the other end of said passages to the inlet of said heat-exchanger and including a portion in heat-exchange relation with the reservoir, a conduit connecting the outlet of the heat-exchanger to the reservoir, and a radiation shield surrounding all of said elements, whereby a coolant fluid in the reservoir is continuously vaporized by the heat of its superheated vapor flowing through the active portion, and continuous flow of coolant is maintained by the pressure of coolant condensed in the heat-exchanger, all coolant flowing through the active portion being in the vapor phase.

2. Apparatus for flowing steam through the active portion of a neutronic reactor comprising hexagonal BeO blocks having apertures and cylindrical rods of sintered BeO and $UO_2$ positioned in said apertures, the spaces between the apertures and the rods being adapted to permit the flow of a fluid coolant therethrough, said apparatus comprising a reservoir of water from which said water is to be evaporated into steam by application of heat, conduit means for flowing said steam into said active portion, hydrostatic means for preserving a positive pressure differential through said apertures, a heat exchanger for condensing steam, conduit means for flowing steam from said active portion to said heat exchanger by way of said reservoir to convert the water therein to steam, and conduit means for flowing water from said heat exchanger to said reservoir.

3. Apparatus for flowing steam through the active portion of a neutronic reactor comprising hexagonal BeO blocks having apertures and cylindrical rods of sintered BeO and $UO_2$ positioned in said apertures, the spaces between the apertures and the rods being adapted to permit the flow of fluid coolant through said active portion, said apparatus comprising a reservoir of water wherein said water is adapted to be evaporated into steam by application of heat, conduit means for flowing said steam into said active portion, hydrostatic means for preserving a positive differential through said apertures, a heat exchanger for condensing the steam, conduit means for flowing steam from said active portion to said heat exchanger by way of said reservoir to convert the water therein into steam, and conduit means for flowing water from said heat exchanger to said reservoir, a quantity of fluid obtaining heat energy from said heat exchanger, a prime mover adapted to convert heat energy of said fluid to mechanical energy, means for flowing said fluid successively through the heat exchanger and then through the prime mover, and means for shielding said prime mover from particles and radiations emitted from said reactor and from said steam.

References Cited in the file of this patent

UNITED STATES PATENTS

| 44,038 | Baker | Aug. 30, 1864 |
| 2,708,656 | Fermi et al. | May 17, 1955 |

FOREIGN PATENTS

| 114,150 | Australia | May 2, 1940 |
| 233,011 | Switzerland | Oct. 2, 1944 |
| 861,390 | France | Oct. 28, 1940 |
| 361,473 | Germany | Oct. 14, 1922 |

OTHER REFERENCES

Kelly et al.: Physical Review, 73, 1135–9 (1948).